United States Patent [19]

Nomura et al.

[11] Patent Number: 4,972,818
[45] Date of Patent: Nov. 27, 1990

[54] CONTROL APPARATUS OF INTERNAL COMBUSTION ENGINE

[75] Inventors: Toshiro Nomura, Kumamoto; Seiichi Kikuchi, Katsuta; Toshio Ishii, Mito; Yasunori Mouri; Takeshi Atago, both of Katsuta, all of Japan

[73] Assignees: Hitachi, Ltd., Tokyo; Suzuki Jidosha Kogyo Kabushiki Kaisha, Shizuoka; Hitachi Automotive Engineering, Ltd., Ibaraki, all of Japan

[21] Appl. No.: 313,038

[22] Filed: Feb. 21, 1989

[30] Foreign Application Priority Data

Mar. 2, 1988 [JP] Japan ................... 63-47573

[51] Int. Cl.$^5$ ............................. F02P 7/067
[52] U.S. Cl. ................... 123/414; 123/424; 123/609
[58] Field of Search ............... 123/414, 416, 417, 424, 123/609, 617

[56] References Cited

U.S. PATENT DOCUMENTS

| 4,310,888 | 1/1982 | Furuhashi et al. | 123/417 X |
| 4,355,613 | 10/1982 | Rode et al. | 123/414 |
| 4,485,785 | 12/1984 | Hill | 123/414 X |
| 4,658,788 | 4/1987 | Yamamoto et al. | 123/424 X |

FOREIGN PATENT DOCUMENTS

| 38375 | 3/1983 | Japan | 123/414 |
| 42154 | 9/1987 | Japan | . |

Primary Examiner—Tony M. Argenbright
Attorney, Agent, or Firm—Antonelli, Terry, Stout & Kraus

[57] ABSTRACT

On an outer peripheral portion of a rotor (1), three protrusions are provided per each cylinder. A pickup coil 2 is disposed facing to the outer peripheral portion with a predetermined distance. A rotation signal ($S_0$) is converted to a rotation signal pulse ($S_1$) having three pulses (A, B and C) per each cylinder corresponding to the three protrusions. According to the first signal (A) of the rotation signal pulse ($S_1$) the cranking ignition period ($A_1$) is determined. According to the second signal (B) of the rotation signal pulse ($S_1$), the starting timing for flowing current to the ignition coil (8) is decided. According to the third signal (C) of the rotation signal pulse ($S_1$), the ignition timing at cranking operation is defined by detecting time intervals (3t, t, 2t) between the three signals (A, B, C).

13 Claims, 3 Drawing Sheets

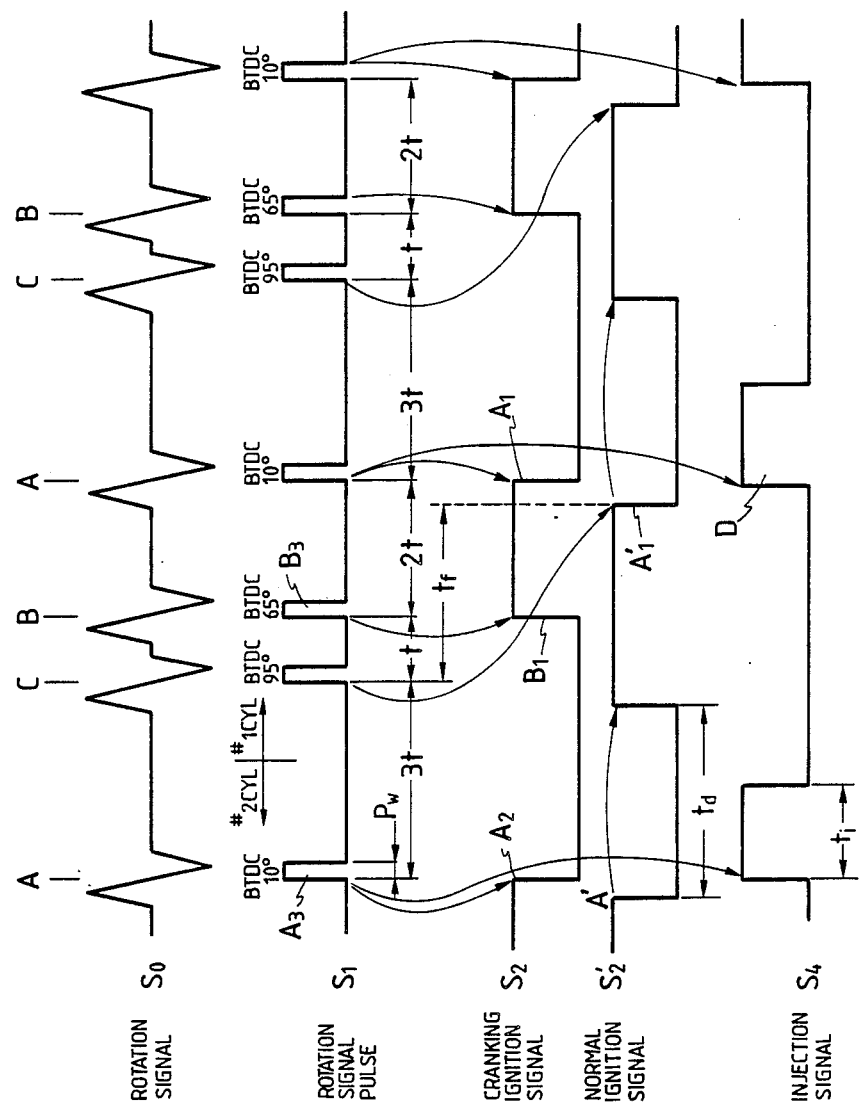

CONTROL APPARATUS OF INTERNAL COMBUSTION ENGINE

FIELD OF THE INVENTION

The present invention relates to a control apparatus of an internal combustion engine. More specifically, the present invention relates to a control apparatus which operates to control ignition timing and fuel injection at the time of starting or cranking of the internal combustion engine of a vehicle.

BACKGROUND OF THE INVENTION

Conventional control apparatus of an internal combustion engine is required to output two kinds of signals corresponding to rotation of a crank shaft, for instance, a first signal which is at a high level when the crank shaft reaches top dead center (TDC) and a second signal which is at a high level for every two degrees rotation of the crank shaft, as shown in FIG. 1 of Japanese Patent Publication No. 62-42154 published on Sept. 7, 1987 entitled "Ignition Timing Control Apparatus". Therefore, the prior art requires two sets of pickup elements for detecting the rotation of the crank shaft and one or two sets of rotors for outputting the two kinds of signals.

The prior art of Japanese Patent Publication No. 62-42154 does not consider reduction in the number of parts for producing the above-mentioned signals. Accordingly, the prior art has a drawback that two sets of pickup elements and two sets of rotors for producing two kinds of signals are required as signal sources of the signals outputted according to the rotation of the crank shaft.

SUMMARY OF THE INVENTION

An object of the present invention is to make it possible for one rotor to produce three signals corresponding to the rotational position of the crank shaft, thereby to reduce the number of pickup elements and rotors required for this purpose.

For attaining the object mentioned above, the present invention produces same waveform three signals per each cylinder of the internal combustion engine as rotation angle position signals of the crank shaft as follows:

(i) The first signal is used as an ignition timing signal at the time of cranking of the internal combustion engine.

(ii) The second signal is used for starting current flow to the ignition coil at the time of cranking of the internal combustion engine.

(iii) The third signal is used for distinguishing the first and second signal at each cylinder. The time intervals between the first signal of the advanced cylinder and the third signal, between the third signal and the second signal, and between the second signal and the first signal of the cylinder are measured. By measuring the length of the time intervals, the first and second signals of the cylinder are determined.

By providing one set of rotors and one set of pickup elements for producing the first, second and third signals of each cylinder, and means for measuring and storing the time intervals of the three signals and for comparing the time intervals of the signals, the object of the present invention can be attained as apparent from the following explanation concerning the function thereof.

The time intervals of the three signals generated at each rotation of the crank shaft are measured and memorized. By comparing the magnitude of the time intervals of the three signals, the determination of the first, second and third signals is carried out. The cranking of the internal combustion engine is carried out in such a way that current flow to the ignition coil is started by the second signal and ignition is controlled by the first signal. The ignition coil current flow or ignition is based on the most desirable timing signal which is determined by the condition of the load, the revolution speed and the intake air flow rate of the internal combustion engine after the engine starts cranking. In this way, the ignition timing control of the internal combustion engine is carried out by the rotational angle position signal of the crank shaft which is obtained by a single pickup coil without using a number of pickup coils.

BRIEF DESCRIPTION OF THE DRAWINGS

FIG. 2 shows waveforms for explaining the operation of the control apparatus of the present invention when the engine starts cranking and is operating in normal;

DETAILED DESCRIPTION OF THE PREFERRED EMBODIMENT

Figure 1:
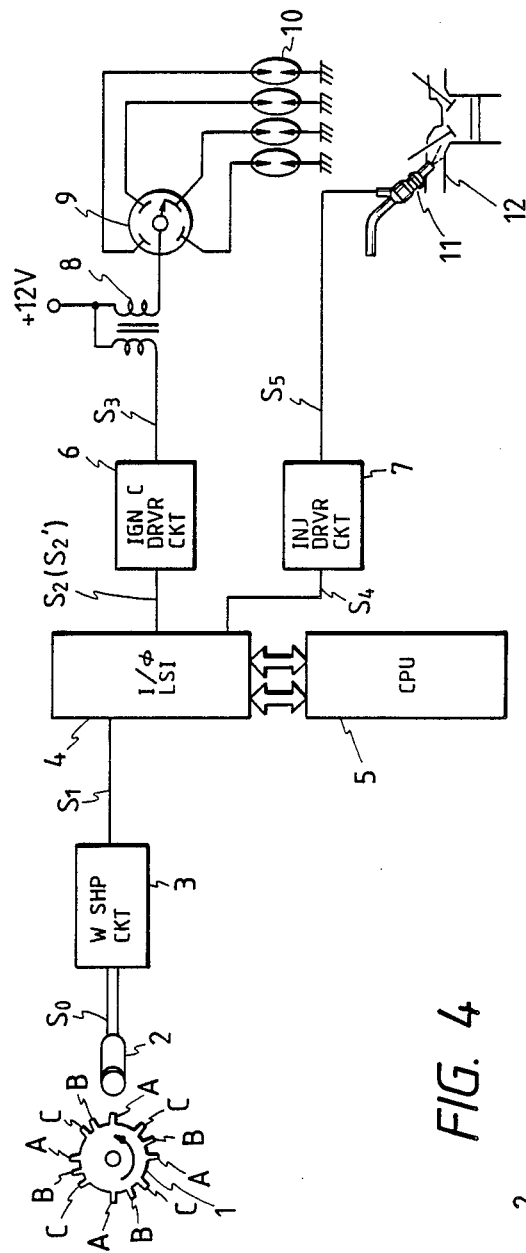
FIG. 1 illustrates a block diagram of one embodiment of the present invention.

Referring to FIG. 1, 1 denotes the rotor which rotates in synchronism with to the crank shaft. The pickup coil 2, which faces an outer peripheral portion of the rotor with a predetermined air gap, produces a rotational signal $S_0$ in synchronism with the rotation of the crank shaft. The rotational signal $S_0$ is converted to a rotation signal pulse $S_1$ through a waveform shaping circuit 3. The large scale integrated circuit (LSI) 4 is an input/output (I/O) circuit connected to the microcomputer (CPU) 5, which calculates the ignition timing, the current conducting time interval, and the fuel injection amount based on at least rotational speed, water temperature, air amount aspirated in the cylinder, throttle position, and knocking of the engine, and outputs the ignition signal $S_2$ through the I/O circuit 4. The I/O circuit 14 under control of the CPU 5 controls the current flowing to the ignition coil 8 through the ignition coil drive circuit 6. The I/O circuit 14 under control of the CPU 5 outputs the injection signal $S_4$ and controls the injection timing through the injection driver circuit 7. The high voltage current produced at the ignition coil 8 is distributed to the ignition plugs 10 through the distributor 9. FIG. 1 exemplifies an embodiment having four cylinders.

Figure 4:
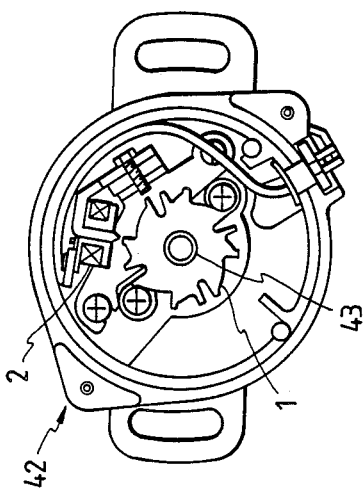
FIG. 4 shows a plain view of an ignition distributor which encloses the rotational angle position signal detecting sensor.

As disclosed in FIG. 4, the rotor 1 is enclosed in the distributer 42, and fixed to the distributor shaft 43. The rotor 1 rotates with the cam shaft (not shown) at the same rotational speed, and rotates at a half rotational speed of the crank shaft (not shown).

The pickup coil 2 is disposed within the distributor 42 opposite to the rotor 1.

Hereunder, we will explain the timing and method of discrimination between the rotational signals of the present invention in an internal combustion engine having four cycles and four cylinders.

The shaft of the rotor 1 rotates at the same speed as the cam shaft and at half the speed of the crank shaft. Three protrusions are provided at the outer peripheral portion of the rotor 1 at intervals of 90 degrees as shown by A, C and B in FIG. 1, in which an arrow shows the rotation direction of rotor 1. When the each protrusion passes by the pickup coil 2, the magnetic flux passing through the pickup coil 2 is varied so that the rotation signal $S_0$ is generated as shown in FIG. 2. The signal obtained by passing the signal $S_0$ through the waveform shaping circuit 3 is the rotation pulse signal $S_1$. The position of the three protrusions A, C and B is provided, for instance in the No. 1 cylinder, to be an ignition timing $A_1$ of the No. 1 cylinder at the starting of cranking, a start timing $B_1$ for starting current flow to the ignition coil, and a certain timing which is located between the ignition timing $A_2$ of the No. 2 cylinder which is ignited just before the ignition of the No. 1 cylinder and the start timing $B_1$.

In the embodiment of the present invention, the timings explained above are set as follows:

(1) The ignition timing $A_1$ corresponding to the first signal A; before top dead center (BTDC) 10°.

(2) The start timing $B_1$ for the flow of current to the ignition coil corresponding to the second signal B: BTDC 65°.

(3) The certain timing which is located between the ignition timing $A_2$ of the No. 2 cylinder and the start timing $B_1$ corresponding to the third signal C which is used for discriminating the first signal A and the second signal B of the first cylinder: BTDC 95°.

As shown in FIG. 2, each rotation signal pulse has the same wave height and the same pulse width $P_w$. Accordingly, it is necessary to discriminate each pulse timing, as explained above.

As shown in the pulse train of the rotation signal pulse $S_1$ in FIG. 2, the first time interval between the first signal A of No. 2 cylinder and the third signal C of No. 1 cylinder is 3t, when the second time interval between the third signal C of the first cylinder and the second signal B of the first cylinder is taken as t. And, the third time interval between the second signal B of the first cylinder and the first signal A of the first cylinder is 2t. Therefore, the ratios of the first time interval, the second time interval and the third time interval are 3t:t:2t. By discriminating these three time intervals, the first, second and third signals (A, B and C) of the same cylinder can be distinguished from each other.

Figure 3:
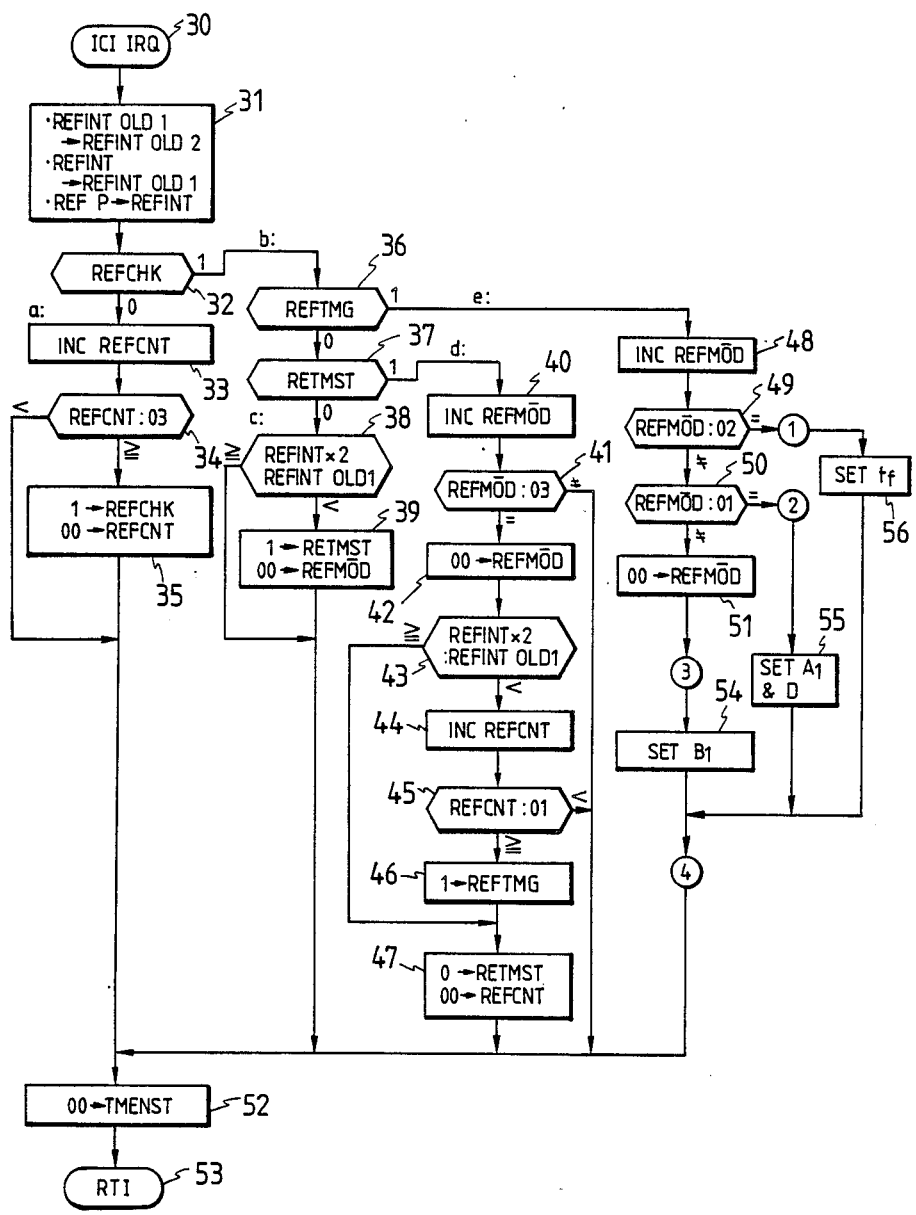
FIG. 3 shows a flow chart showing a discrimination method of the rotational signal of the present invention.

FIG. 3 shows a flow chart for explaining the discrimination of the rotation pulse signal relating to the first, second and third signals A, B and C. When each pulse $S_1$ is inputted from the wave shaping circuit 3 to the I/O circuit 4, the reference period (REF P), which is the time interval from the previous pulse input to the present pulse input, is measured by a pulse period measuring device (not shown) enclosed in the I/O circuit 4, and the device outputs an interrupt signal to the CPU 5 so that an input capture interrupt or an interrupt request (ICI IRQ) is started at step 30. A REFINT denotes the present pulse interval, a REFINT old 1 the previous pulse interval, and a REFINT old 2 the next previous pulse interval among the rotation signals. At step 31, REFINT, REFINT old 1, and RETINT old 2 are renewed from old data to new data to store the new data. The reference check (REFCHK) at step 32 is a flag which does not deal with the discrimination of pulses from the first pulse to the second pulse, is set when the third pulse is inputted, and is removed from the discrimination procedure a to the discrimination procedure b when the fourth pulse is inputted. Step 32 checks the flag. When the flag is zero, the flow advances to step 33. When the flag is one, the flow advances to step 36. At step 33, a reference counter (REFCNT) is incremented by one. At step 34, when the value of the REFCNT is above three, the flow is forwarded to step 35. When the value of the REFCNT is below three at step 34, the flow is forwarded to step 52. At step 35, the REFCHK is set and the REFCNT is reset. The reference timing (REFTMG) at step 36 is a flag for showing whether the pulse discrimination is carried out correctly or not. At an initial state, the REFTMG is cleared to advance to the discrimination procedure C. When the pulse discrimination is successful, the REFTMG is set to advance to the discrimination procedure e. At step 36, the REFTMG flag is checked. When the flag of step 36 is zero, the flow advances to step 37. When the flag of step 36 is one, the flow advances to step 48. The reference timer start (RETMST) is carried out at step 37 at an initial state. At step 37, the RETMST flag is checked. When the flag of step 37 is zero, the flow proceeds to step 38. When the flag of step 37 is one, the flow proceeds to step 40.

At step 38, two times the introduced pulse period REFINT ($=t$) and the previous pulse period REFINT old 1 ($=3t$) are compared. Namely, at step 38, it is checked whether the following formula is satisfied.

$$\text{REFINT} \times 2 < \text{REFINT old 1} \ldots \quad (1)$$

When REFINT$\times 2 \geq$REFINT old 1, the flow proceed to step 52. When REFINT$\times 2 <$REFINT old 1, the flow proceed to step 39. At step 39, the RETMST flag is set and the reference mode (REFMOD) is reset. When the BTDC 10° signal is inputted, the REFMOD becomes 1. When the BTDC 95° signal is inputted, the REFMOD becomes 2. When the BTDC 65° signal is inputted, the REFMOD becomes 3.

Concerning the formula (1), in the pulse A at BTDC 10° and the pulse C at BTDC 95°, the formula (1) is not satisfied, since the preceding pulse period REFINT old 1 is shorter than the present pulse period REFINT. According to the formula (1), the pulse B and other pulses A and C are not discriminated wrongly. When the discrimination procedure (c) is certified to be carried out correctly by using a memory (not shown) at the I/O circuit 4, the discrimination procedure (c) is advanced to the next discrimination procedure (d). In the discrimination procedure (d), the discrimination of the pulse period is also carried out at each pulse input of the three pulses corresponding to the rotational signals A, B and C as in the case of the discrimination procedure (c). When the formula (1) is realized at the discrimination procedure (c), the increment of the REFMOD is carried out at step 40. At step 41, the REFMOD is three and the flow proceeds to step 42. When the REFMOD at step 41 is not three, the flow proceeds to step 52. At step 42, the REFMOD is set. At step 43, when REFINT$\times 2 \geq$REFINT old 1, the flow proceeds to step 47. When REFINT$\times 2 <$REFINT old 1, the flow proceeds to step 44. At step 44, the increment of the reference counter (REFCNT) is carried out. At step 45, when the value of the REFCNT is more than one, the flow proceeds to step 46. When the value of the REFCNT at step 45 is below one, the flow proceeds to step 52. At step 46, the REFTMG flag is set. At step 47, the RETMST flag is cleared and the REFCNT is also cleared. When the formula (1) is certified once at the memory of the I/O circuit 4 in the discrimination procedure (d), the procedure (d) proceeds to the discrimination procedure (e).

The discrimination procedures (c) and (d) are used for checking whether the CPU 5 carries out the discrimination of the formula (1) correctly and for resetting the content of the REFMOD. At step 48, the incrementing of REFMOD is carried out by adding one to the REFMOD. At step 49, when the content of the REFMOD is two, the flow proceeds to step 56 through the procedure ①. When the content of the REFMOD is not two, the flow proceeds to step 50. At step 50, when the content of the REFMOD is one, the flow proceeds to step 55 through the procedure ②. When the content of the REFMOD is neither two nor one, the flow proceeds to step 51. At step 51, the REFMOD is reset, and the flow proceeds to step 54 through the procedure ③. The procedure ② is carried out by the pulse A. The procedure ③ is carried out by the pulse B. The procedure ① is carried out by the pulse C. The pulse A corresponds to the ignition timing of the engine cranking. The pulse B corresponds to the start timing of the flow to the ignition coil. When the engine starts cranking, the signal $S_2$ for starting the current flow to the ignition coil 8 at the procedure ③ and for stopping the current flow to the ignition coil 8 at the procedure ② is outputted from the I/O circuit 4. At step 54, the timing of $B_1$ is set, and the flow proceeds to carry out the synchronized procedure to the BTDC 65° signal. At step 55, the timing of $A_1$ and D is set and the flow proceeds to carry out the synchronized procedure to the BTDC 10° signal. At step 56, $t_f$ is set and the flow proceeds to carry out the synchronized procedure to the BTDC 95° signal. These signals from the steps 54, 55 and 56 are transmitted to step 52 through the procedure ④. Step 52 resets the timer engine stop (TMENST). Step 53 orders to return to interrupt (RTI).

The ignition coil driver circuit 6 inputs signals $S_2$ and normal ignition signal $S_2'$ from the I/O circuit 4, and outputs an amplified signal $S_3$ for driving the ignition coil 8. The drive signal from the circuit 8 is inputted to the primary winding of the ignition coil 8, and induces a high voltage to the secondary winding of the ignition coil 8 for discharging a current to the spark plug 10 which is necessary to the ignition of the engine.

In the procedure ② by the pulse A, the I/O circuit 4 outputs the fuel injection signal $S_4$. By the fuel injection signal $S_4$, the signal $S_5$ which is amplified by the injector driver circuit 7 opens the nozzle within the injector 11 and injects the compressed fuel to the intake air pipe 12 by means by a fuel pump (not shown). The opening valve interval $t_i$ is decided by the condition of at least the air amount aspirated in the cylinder and the water temperature, and is incremented by an increased compensation component for making the cranking of the engine.

When the rotation speed of the engine exceeds a predetermined value and a number of injection which is decided by the water temperature is finished after the engine cranking, the engine cranking is finished and the engine enters into the operating condition or normal condition. When the engine begins the normal operation, the ignition timing control is changed to a normal operating state. The ignition timing is set by the CPU 5 based on the rotational speed and the load of the engine. The CPU 5 calculates the time interval $t_f$ from the pulse C of the rotation signal $S_1$ and the ignition timing A' at the normal operation. The time interval $t_f$ and the ignition timing $A_1'$ are set to a timer (not shown) of the I/O circuit 4. The I/O circuit 4 changes the cranking ignition signal $S_2$ to the normal ignition signal $S_2'$ at the normal operation. The normal ignition is carried out in such a way that the normal ignition signal is changed to a low level after $t_f$ time from the pulse C input so as to stop the current flow to the ignition coil 8 and ignites the ignition coil 8. The start timing of current flow to the ignition coil 8 at normal operation is carried out to count the time interval $t_d$ from the reference of the ignition timing A' in the normal ignition signal $S_2'$ by the CPU 5 and the value of the time interval $t_d$ is set to the I/O circuit 4. The I/O circuit 4 outputs a high level signal after passage of the time $t_d$ from the trailing edge A' of the previous normal ignition signal $S_2'$, and starts current flow to the ignition coil 8. The time intervals $t_d$ and $t_f$ are renewed at every ignition period. The time interval $t_d$ is demanded so as to not exceed 80% of the duty ratio of the normal ignition signal $S_2'$ for preventing the burning of the ignition coil 8 caused by the large interval of the current flow to the ignition coil.

When the ignition control by the normal ignition signal is not able to be carried out by any trouble, the trouble is detected by using an abnormal discrimination circuit (not shown) enclosed in the I/O circuit 4, a backup signal is produced from a memory (not shown) enclosed in the I/O circuit 4, the ignition control is changed from the control by the normal ignition signal $S_2'$ to that of the cranking ignition signal $S_2$ for preventing the engine from stopping and breakage of the engine.

In FIG. 1, we referred to an example in which a magnetic pick up system is used as a signal generating means 1 and 2. However, the present invention is not limited to the magnetic pick up system as the signal generating means 1 and 2. For instance, the present invention includes an optical type signal generating means or a hole sensor type signal generating means instead of the magnetic pick up signal generating means.

What we claim is:

1. A control apparatus for an internal combustion engine, comprising:
   regulating means for regulating flow rate and supply timing of fuel flow for fuel supplied to the internal combustion engine;
   generating means for generating a high voltage for ignition of fuel supplied to the internal combustion engine; and
   control means for controlling at least one of a fuel supply interval, a fuel supply flow rate, and ignition timing, including setting means for setting a cycle timing of a signal used for controlling said internal combustion engine based on an output signal from a sensor for detecting a rotational angle of a rotor connected to said internal combustion engine, and decide means for deciding at least said ignition timing at cranking of said engine based on the cycle timing;
   wherein said sensor comprises means for outputting three signals during one cycle of each cylinder in synchronization with a rotational position of the rotor of said engine.

2. A control apparatus according to claim 1, wherein said decide means calculates said ignition timing which is produced based on a first signal among said three signals.

3. A control apparatus according to claim 2, wherein said decide means outputs a backup ignition signal based on a calculated ignition timing when said control apparatus is detected to be out of order.

4. A control apparatus according to claim 1, wherein said decide means calculates a timing for starting a current flow to a primary winding of an ignition coil based on a second signal among said three signals.

5. A control apparatus according to claim 4, wherein said decide means outputs a backup ignition signal based on a calculated ignition timing when said control apparatus is detected to be out of order.

6. A control apparatus according to claim 1, wherein said decide means includes means for calculating said ignition timing based on a first signal among said three signals and a timing for starting a current flow to a primary winding of an ignition coil based on a second signal among said three signals, and means for identifying the first and second signals for each cylinder using a third signal among said three signals to measure the time intervals between the first, second and third signals, respectively.

7. A control apparatus of an internal combustion engine according to claim 1, wherein said sensor comprises a pickup coil for detecting said three signals and said rotor has three protrusions per each cylinder of said engine on an outer peripheral portion thereof, said pickup coil facing said rotor for producing said three signals when the protrusions pass the pickup coil in synchronization with rotation of said engine.

8. A control apparatus of an internal combustion engine according to claim 7, wherein said sensor is enclosed in an ignition distributor.

9. A control apparatus for an internal combustion engine, comprising:
   regulating means for regulating flow rate and supply timing of fuel flow for fuel supplied to the internal combustion engine;
   generating means for generating a high voltage for ignition of fuel supplied to the engine;
   control means for controlling at least one of fuel supply interval, fuel supply flow rate and ignition timing; and
   a sensor including a pickup coil for detecting three signals during one cycle of each cylinder and a rotor which is driven from a cam shaft of the engine and has three protrusions per each cylinder of said engine on an outer peripheral portion thereof, said pickup coil facing said rotor for producing the three signals with the protrusions pass the pickup coil in synchronization with rotation of the cam shaft of said engine, said protrusions being spaced such that the intervals between the three signals are different from each other;
   wherein said control means comprises setting means for setting a cycle timing of a signal used for controlling said engine based on said three signals from said sensor and decide means for deciding at least said ignition timing of said engine based on said cycle timing;
   said decide means including means for calculating said ignition timing based on a first signal among said three signals and a timing for starting a current flow to a primary winding of an ignition coil based on a second signal among said three signals, and means for identifying the first and second signals for each cylinder using a third signal among said three signals to measure the intervals between the first, second and third signals, respectively.

10. A control apparatus according to claim 9, wherein said decide means outputs a backup ignition signal based on a calculated ignition timing when said control apparatus is detected to be out of order.

11. A control apparatus of an internal combustion engine according to claim 9, wherein said sensor is enclosed in an ignition distributor.

12. A control apparatus of an internal combustion engine according to claim 9, wherein a large scale integrated circuit is connected to said pickup coil, and a driver circuit is provided for controlling current flow of a first winding of said ignition coil by an output signal from said large scale integrated circuit.

13. A control apparatus of an internal combustion engine according to claim 12, wherein a first driver circuit is connected to said large scale integrated circuit for controlling a current flow of said ignition coil based on an output signal from said large scale integrated circuit, and a second driver circuit is connected to said large scale integrated circuit for controlling fuel injection based on an output signal from said large scale integrated circuit.

* * * * *